UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

BASIC YELLOW DYE.

SPECIFICATION forming part of Letters Patent No. 515,100, dated February 20, 1894.

Application filed November 29, 1893. Serial No. 492,405. (Specimens.) Patented in Germany November 18, 1892, No. 70,678; in France November 28, 1892, No. 225,968, and in England December 8, 1892, No. 22,572.

*To all whom it may concern:*

Be it known that I, ARTHUR WEINBERG, a subject of the King of Prussia, and a resident of Frankfort-on-the-Main, Germany, have invented new and useful Improvements in the Manufacture of New Basic Dye-Stuffs, (and for which patents have been obtained in Germany, No. 70,678, dated November 18, 1892; in France, No. 225,968, dated November 28, 1892, and in Great Britain, No. 22,572, dated December 8, 1892,) of which the following is a specification.

This invention has for its object the production of new dye-stuffs of the azo series which in consequence of the presence of a basic group, will dye cotton, with the aid of tannin mordants. The new dye-stuffs do not show the sensibility to the action of acids of analogous bodies hitherto known. A difference in the shade between the base and the salts has been observed in basic azo-dyes which contain the basic group, (for instance the dimethylamido group) in the aromatic nucleus with which the azo-group is combined, as for instance with amidoazobenzene, methyl-orange. If however, the dimethylamido group is not in the nucleus but in a lateral methyl group, the change from base to salt loses its influence on the absorption of light. If for instance, para amidobenzyldimethylamin $(CH_3)_2N-CH_2-C_6H_4-NH_2$ is diazotized and combined with beta-napthol, a dyestuff results of the shade of the analogous azo derivative from para toluidin, which forms an easily soluble chlorhydrate having exactly the same orange color as the free base. This observation also opens a way to make azo-colors soluble in water without changing their properties.

In the following I describe the simplest application of the invention. The start may be from the different isomeric modifications of amidobenzyldialkylamin, which are easily obtainable. If para-nitrobenzylchloride and dimethylamin are brought together, a reaction quickly takes place, which is terminated when the product is soluble in diluted acid without residue. The para-nitrobenzyldimethylamin is distinguished by the property of its salts to crystallize, especially the salt of the chlorhydrate; the reduction is carried out by known means. The solutions of para-amidobenzyldimethylamin can be used directly for producing the dye stuffs. In the place of the pure para compound the start may be from the mixture of the various isomers, which is obtained by nitration of benzylchlorid (Kumpf, *Liebig's Annales*, p. 240, Noelting, *Berichte der Deutschen Chemischen Gesellschaft*, Vol. XVIII, p. 385). Or benzylchlorid and dimethylamin are first condensed (V. Meyer, *Berichte der Deutschen Chemischen Gesellschaft*, X, p. 310), then the dimethylbenzylamin is dissolved in three parts of sulfuric acid and one equivalent of nitric acid (mixed with sulfuric acid) is added while cooling. The nitration results in nearly quantitative proportion. By this process the various isomers are formed simultaneously, but principally the para-compound.

The following example may illustrate the method of producing the dye stuffs. Fifteen kilograms of amidobenzyldimethylamin are dissolved with forty kilograms muriatic acid and while cooling seven kilograms nitrate are added. The easily soluble diazo-compound is formed immediately and is allowed to run into the diluted solution of eleven kilograms of resorcin, dissolved in fifty kilograms of soda; the dye-stuff separates; it is filtered off and dissolved in twelve kilograms of muriatic acid and two hundred liters of water; the chlorhydrate is precipitated from the solution with common salt. In an exactly analogous way the combination with other phenols and with amins may be obtained.

Having thus described my invention and in which manner it can be performed, what I claim as new, and desire to secure by Letters Patent, is—

1. The process of producing new basic dye-stuffs by combining diazobenzylalkylamins with phenols or amins, substantially as described.

2. The new dye derived from diazobenzyldialkylamin and resorcin having the formula $$HCL.(alk.)_2N-CH_2-C_6H_4-N=N-C_6H_3(OH)_2$$

which is a yellow powder, readily soluble in water, in alcohol and in concentrated sulfuric acid with yellow color and dyeing cotton mordanted with tannin yellow or yellowish brown substantially as described.

In testimony that I claim the foregoing as my invention I have signed my name, in presence of two witnesses, this 11th day of November, 1893.

ARTHUR WEINBERG.

Witnesses:
ALVESTO S. HOGUE,
JEAN GRUND.

It is hereby certified that in Letters Patent No. 515,100, granted February 20, 1894, upon the application of Arthur Weinberg, of Frankfort-on-the-Main, Germany, for an improvement in "Basic Yellow Dye," an error appears in the printed specification requiring the following correction, viz: On page 1, line 74, the word "nitrate" should read *nitrite;* and that the said Letters Patent should be read with this correction therein that the same may conform to the record of the case in the Patent Office.

Signed, countersigned, and sealed this 27th day of March, A. D. 1894.

[SEAL.]

JNO. M. REYNOLDS,
*Assistant Secretary of the Interior.*

Countersigned:

JOHN S. SEYMOUR,
*Commissioner of Patents.*